United States Patent

[11] 3,621,207

| [72] | Inventor | Patrick Bass |
| | | London, England |
| [21] | Appl. No. | 813,908 |
| [22] | Filed | Apr. 7, 1969 |
| [45] | Patented | Nov. 16, 1971 |
| [73] | Assignee | United Gas Industries |
| | | London, England |
| [32] | Priority | Apr. 19, 1968 |
| [33] | | Great Britain |
| [31] | | 18,716/68 |

[54] ROAD PRICING METER
4 Claims, 1 Drawing Fig.

[52] U.S. Cl. .................................................. 235/92 C,
235/92 R, 235/92 TC, 235/92 DN, 340/38, 235/92 F

[51] Int. Cl. ..................................................... G06m 1/08, G01d 4/00

[50] Field of Search ........................................ 235/92 (1),
92 (1.1), 92 (21), 92 (36), 92 (29 D), 95; 340/38, 378, 9; 58/46, 48

[56] References Cited
UNITED STATES PATENTS

| 2,613,791 | 10/1952 | Triman | 235/92 U |
| 2,618,117 | 11/1952 | Maar | 58/46 |
| 2,657,526 | 11/1953 | Gazda | 58/46 |
| 2,744,685 | 5/1956 | Lambert et al. | 235/92 |
| 2,769,301 | 11/1956 | Liebman | 58/46 |
| 3,440,600 | 4/1969 | Frech et al. | 340/38 X |

*Primary Examiner*—Maynard R. Wilbur
*Assistant Examiner*—Joseph M. Thesz, Jr.
*Attorney*—Larson, Taylor & Hinds

ABSTRACT: A meter for receiving and counting impulses from outside suitable, for instance, as a road pricing meter to be carried on a motor vehicle and to receive and count impulses to indicate the amount of use made by that vehicle of the road. The meter includes a spiral power spring which is coupled to a counter through an escapement. The escapement is operated by the signals received from outside to permit a desired degree of advancement for each signal. The energy in the spiral power spring is replenished by means of an oscillating weight winding the spring up through a pawl and ratchet gear.

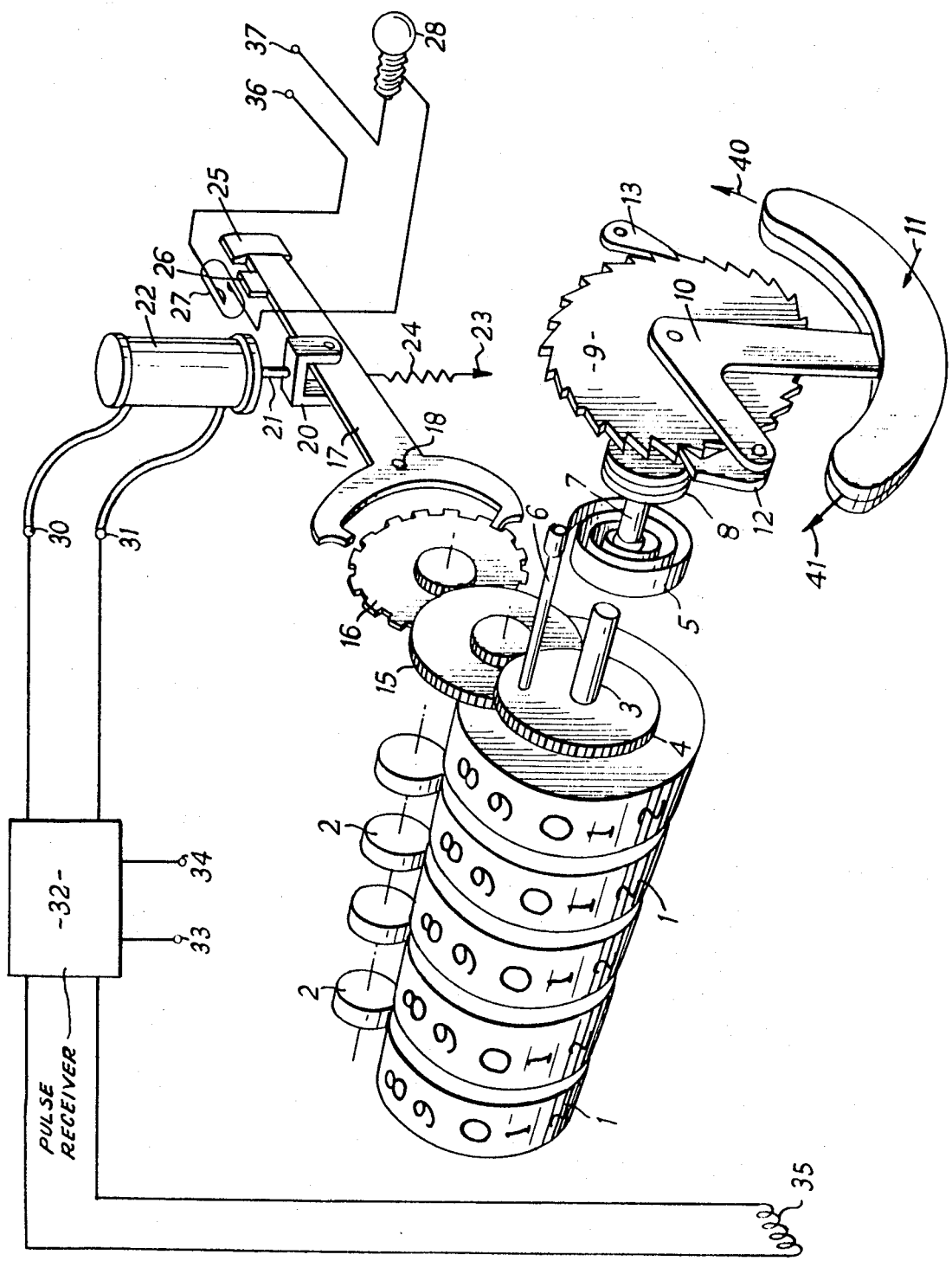

ROAD PRICING METER

BACKGROUND OF THE INVENTION

This invention relates to a meter which includes a store of energy which is at least partially responsible for driving the meter. Such a meter has particular, though not exclusive, application to systems in which road vehicles are the subject of a charge according to some use of the roads, for example according to the amount of travel within a given area or according to periods of parking within a given area. It has been proposed that the users of road vehicles should be charged either according to the number of times that they pass from one area or zone to another or according to the length of time that they remain parked in a particular area or zone. The recording of the necessary information may be made by means of a meter carried on the vehicle. Ideally this meter should include its own store of energy to drive it and should not have to rely on energy supplied either mechanically or electrically from the vehicle.

SUMMARY OF THE INVENTION

According to the present invention there is provided a meter including a counter, a store of energy arranged to operate the counter when a signal is received from outside the meter, and means for replenishing the store of energy.

BRIEF DESCRIPTION OF THE DRAWING

The accompanying drawing is a diagrammatic, perspective view of an electromechanical meter arrangement.

DESCRIPTION OF PREFERRED EMBODIMENT

In the drawing there is shown by way of example a counter having five numeral indicator wheels 1 coupled together, as indicated by wheels 2, in known manner. The wheels 1 are arranged on a shaft 3 which carries a gear wheel 4 and the assembly is driven from a store of energy constituted by a spiral power spring 5, one end of which is attached to a pin 6 extending from the gear wheel 4. The other end of the spring 5 is attached through a spindle 7 and a friction clutch 8 to means for replenishing the energy stored in the spring 5. These means comprise a one-way drive connection between an oscillating body or weight 11 and the clutch 8. The weight 11 is mounted on one arm of a bellcrank 10, the other arm of which carries a pawl 12 to drive a ratchet wheel 9. The ratchet wheel 9 is connected by a shaft (not shown) to the clutch 8 and is prevented from rotating anticlockwise, as seen in the drawing, by a pawl 13.

A compound gear wheel 15 engages with the gear 4 on the shaft 3 and is coupled to an escapement wheel 16 engageable with one of two teeth on an escapement arm 17 which is pivotable about an axis indicated by the line 18.

The arm 17 is coupled via a saddle 20 to the plunger armature 21 of a solenoid 22. The solenoid is shown in its unoperated condition with the arm 17 pivoted in the direction of arrow 23 under the action of a spring 24. At the end of the arm 17 opposite to the teeth is an indicator flag 25 and the arm 17 carries a magnet 26 which is arranged to operate the contacts of a reed switch 27 to switch an indicator lamp 28 on and off. Power is supplied to the indicator lamp circuit via terminals 36 and 37.

The solenoid 22 is connected to a pair of input terminals 30 and 31 to which is coupled the output from a pulse receiver 32 supplied with power via terminals 33 and 34. An input to the pulse receiver 32 is supplied from a pickup coil 35.

The assembly, with the exception of the pickup coil 35 and the pulse receiver 32, is contained within a meter housing, which is sealed and has only the input terminals 30 and 31, and 36 and 37 to which external connections need to be made. The lamp 28 and terminals 36 and 37 can be dispensed with if desired.

In operation the meter is mounted in a vehicle and the movement of the vehicle causes the weight 11 to oscillate as indicated by arrows 40 and 41 thereby reciprocating the bellcrank 10. The bellcrank 10 rotates the ratchet wheel 9 via the driving pawl 12 and the oscillatory motion is rectified by interaction of the ratchet wheel 9 with the pawls 12 and 13, thus causing the spring 5 to be wound via the friction clutch 8. It is not essential for the friction clutch 8 to be interposed between the winding mechanism and the spring 5, but some clutch arrangement is advisable in order to prevent overwinding of the spring 5. The spring 5 is permanently coupled to the counter so that it tends to advance the counter. However, the counter cannot be driven until the escapement wheel 16 is allowed to rotate by the teeth on the arm 17. The arm 17 is pivoted anticlockwise when the solenoid 22 is operated and when released it is pivoted clockwise by the spring 24. The escapement wheel 16 is thus allowed to rotate by one tooth each time that the solenoid 22 is operated and released. Each input of a pulse to the solenoid 22 therefore allows the escapement wheel 16 to rotate by the pitch of one tooth and the counter to be driven by the spring 5 according to the gearing between the escapement wheel 16 and the counter. The pulse supply to the solenoid 22 is obtained from the receiver 32, which is operated in accordance with a pulse signal picked up by the coil 35. The coil 35 is mounted in this particular arrangement externally of the vehicle so that it is able to pick up a signal from an energized loop buried in the ground as the vehicle passes over the loop. Since the pickup coil 35 is within the effective radiation of the loop in the ground for only a short period of time when the vehicle passes over the loop, the induced signal takes the form of a pulse of AC power. Alternatively, a pulsed signal may be radiated from a source to be picked up by the coil 35 while the vehicle is stationary.

If the signal picked up by the coil 35 is sufficiently strong the pulse receiver 32 is not necessary. In such a situation the receiver 32 may consist simply of a tuned circuit and a rectifier. However, where the signal picked up by the loop is comparatively weak and is not sufficient to operate the solenoid 22 the pulse receiver may include an amplifier and a source of power may be connected to the terminals 33 and 34. This power may conveniently be derived from the vehicle battery or from a cell incorporated in the meter, in which case the receiver 32 may also be incorporated in the housing for the meter.

The flag 25 and the lamp 28 are not essential features of the apparatus. However, they provide useful visual indications that the meter is operating since each time a pulse is received the indicator lamp will be lit and the flag 25 will be moved.

The pulse applied through the pulse receiver 32 to the solenoid 22 so that the escapement wheel 16 is allowed to rotate may conveniently allow the counter reading to advance by one unit for each pulse that is received. Alternatively, the gearing between the escapement 16 and the counter may be such that the counter will advance by only one unit for a desired number of received pulses.

The mechanism including the spring 5 which is maintained in a wound condition by the energy supplied through the ratchet wheel 9 by the movement of the weight 11 as a result of the natural movement of the vehicle is similar in principle to the mechanism used in an automatically wound wrist watch. The winding mechanism may be designed to operate in any one of a number of different modes. For example, the weight may be so pivoted nd positioned as to oscillate and wind the spring each time the vehicle accelerates or decelerates. Alternatively, the weight may be oriented to operate by centrifugal force as the vehicle turns a corner or moves from side to side on a road. A further possibility is that the spring may be wound by means of a vibrating weight which moves in accordance with the natural vibrations of the vehicle.

It is not necessary that the energy store should be a spring. Other forms of energy storage, for example a weight able to be raised through a distance, may be used. If the feature that the unit be entirely self-contained is not essential, it is possible for the source of power to be a rechargeable electrical battery which is charged by a supply of current obtained for example from a transducer operated by the movement of the weight 11.

The means for replenishing the energy store may, when the store is of mechanical energy, be operated by changes in ambient conditions, such as temperature or air pressure, in a similar way to known forms of clock. When such changes in ambient conditions are employed to replenish the energy store it may be necessary to use a mechanism having a considerable mechanical advantage for transmitting the energy to the store in order to store sufficient energy to operate the counter mechanism.

The meter may be built into a car in such a way that the base of the meter housing contains the pick up coil 35 and either the whole meter casing, or a part of the meter housing, is of a material which does not screen the coil from the radiated signal. By making the assembly in this way a very secure arrangement is provided.

I claim:

1. A road pricing meter for measuring the amount of use made by a vehicle, in which it is mounted, of any toll roads having signal-producing means, said meter comprising a mechanical counter, spring means connected to drive said mechanical counter, locking means releasably connected to prevent operation of said counter, signal-receiving means for receiving signals from the toll road and releasing said locking means when a signal is received to effect a predetermined driving of said counter, automatic winding means connected to wind up said spring means in response to motions of the vehicle, and clutch means operable to prevent overwinding of the spring means, connected in the drive to said spring means.

2. A meter as claimed in claim 1, wherein said locking means comprises an escapement allowing a predetermined movement of the counter whenever it is released.

3. A meter as claimed in claim 2, wherein said signal-receiving means includes a solenoid connected to release said escapement whenever a signal is received.

4. An electromechanical road pricing meter for mounting in a vehicle to measure the amount of use made by the vehicle of certain roadways having electronic signal-producing means; said meter comprising a mechanical counter comprising a series of rotatable numeral-bearing drums interconnected to measure the mechanical rotational input thereto, a spring means connected to rotate said counter, a pivoted escapement connected to said counter to lock it against rotational movement in one pivotal position and to allow a predetermined rotational movement in another pivotal position, a solenoid operable on said escapement to move it between its pivotal positions, a pulse receiver for receiving said signals from the roadway and connected to apply said signals to operate said solenoid, automatic winding means powered by motion of the vehicle to wind up said spring means, and friction clutch means operable to prevent overwinding of the spring means connected in the drive to said spring means.

* * * * *